United States Patent
Hasegawa (10) Patent No.: US 8,887,377 B2
(45) Date of Patent: Nov. 18, 2014

(54) METHOD FOR MANUFACTURING STATOR CORE

(75) Inventor: Kazuya Hasegawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/532,378

(22) Filed: Jun. 25, 2012

(65) Prior Publication Data

US 2013/0154434 A1 Jun. 20, 2013

(30) Foreign Application Priority Data

Dec. 16, 2011 (JP) ................................ 2011-275660

(51) Int. Cl.
*H02K 1/16* (2006.01)
*H02K 15/02* (2006.01)

(52) U.S. Cl.
CPC ............ *H02K 15/024* (2013.01); *H02K 15/026* (2013.01); *H02K 1/16* (2013.01); *H02K 2201/09* (2013.01)
USPC ............... 29/596; 310/216.004; 310/216.009; 310/216.041

(58) Field of Classification Search
CPC ........................... H02K 15/024; H02K 15/026
USPC .............. 29/596, 598; 310/216.008, 216.009, 310/216.004, 216.041
See application file for complete search history.

(56) References Cited

FOREIGN PATENT DOCUMENTS

| JP | 01138937 | A | * | 5/1989 |
|---|---|---|---|---|
| JP | 1-232705 | A | | 9/1989 |
| JP | 06-246475 | A | | 9/1994 |
| JP | 11-041871 | A | | 2/1999 |
| JP | 11041871 | A | * | 2/1999 |
| JP | 11-220844 | A | | 8/1999 |
| JP | 2001-245446 | A | | 9/2001 |
| JP | 2002-291184 | A | | 10/2002 |
| JP | 2007-306659 | A | | 11/2007 |
| JP | 2010-57221 | A | | 3/2010 |
| JP | 2010057221 | A | * | 3/2010 |
| JP | 2011-87386 | A | | 4/2011 |

OTHER PUBLICATIONS

Japanese Office Action dated Jun. 11, 2013 issued in Japanese Application No. 2011-275660.*

* cited by examiner

*Primary Examiner* — Livius R Cazan
(74) *Attorney, Agent, or Firm* — Sughrue Mion, PLLC (57) ABSTRACT

The method for manufacturing a stator core includes: a punching step in which magnetic segments are punched out of an electromagnetic steel sheet that is coated with an organic insulating coating; a laminating step in which a laminated body is formed by laminating a predetermined number of the punched magnetic segments; a first preheating step in which a welding position on a wall surface of the laminated body is heated locally from a first end to a second end in a direction of lamination to decompose an organic component in the insulating coating thermally at the welding position; and a first welding step in which the welding position at which the organic component in the insulating coating is decomposed thermally is welded from the first end to the second end in the direction of lamination to interconnect and integrate the laminated magnetic segments.

11 Claims, 9 Drawing Sheets

METHOD FOR MANUFACTURING STATOR CORE

BACKGROUND OF THE INVENTION

1. Field of the Invention

The present invention relates to a stator core, a manufacturing method therefor, and a rotary electric machine that uses that stator core, and particularly relates to a stator core that is formed by integrating laminated electromagnetic steel sheets by welding.

2. Description of the Related Art

Conventional stator cores that are used in automotive alternators are formed into an annular shape by laminating a predetermined number of magnetic segments that are punched into predetermined shapes from a magnetic steel sheet by pressing, forming a rectangular parallelepiped laminated core by laser welding outer circumferential portions of the laminated body of magnetic segments, bending the rectangular parallelepiped laminated core annularly, abutting two end surfaces of the bent laminated core, and laser welding the abutted portions thereof (see Patent Literature 1, for example).

Now, organic insulating coatings are coated onto surfaces of the magnetic steel sheet in order to ensure punchability, electrical insulation, and corrosion prevention among the magnetic segments. Thus, organic substances in the insulating coating decompose thermally when the outer circumferential portions of the laminated body of magnetic segments are laser-welded, giving rise to volatile gases. If these volatile gases penetrate into the weld bead, pits and blowholes occur in the weld portion. These pits and blowholes that occur in the weld portion give rise to reductions in weld strength.

Magnetic steel sheets include silicon steel sheets, electromagnetic steel sheets, etc., but in recent years, electromagnetic steel sheets are being used from the viewpoint of reducing core loss. In addition, from the viewpoint of environmental protection, materials that do not contain substances of environmental concern, such as chromium, are used in materials for the electromagnetic steel sheets, and materials that contain organosilicon compounds (silicones) are used in the insulating coatings. Since combustion temperatures of silicones in particular are high, the weld portions harden before the gases formed by combustion finish passing through the weld pool, and welding faults such as pits or blowholes occur easily.

In consideration of such conditions, various countermeasures have been proposed that prevent entry into a weld bead of the volatile gases that are generated by thermal decomposition of the organic substances in the insulating coatings. In the technique according to Patent Literature 2, an electromagnetic steel sheet is used that is formed so as to have a first surface that is a rough surface and a second surface that is a smooth surface, and penetration of gases into the weld bead is stopped by forming air gaps between the magnetic segments by stacking the punched magnetic segments such that the rough surfaces and the smooth surfaces face each other such that the gases that originate from the insulating coating are dispersed through those air gaps during welding. In the technique according to Patent Literature 3, gas drainage channels are formed on the weld portions by pressing, and penetration of gases into the weld bead is stopped by dispersing the gases that originate from the insulating coating through those gas drainage channels during welding.

Patent Literature 1: Japanese Patent Laid-Open No. 2002-159151 (Gazette)

Patent Literature 2: Japanese Patent Laid-Open No. HEI 1-232705 (Gazette)

Patent Literature 3: Japanese Patent Laid-Open No. 2011-87386 (Gazette)

However, in the technique according to Patent Literature 2, because an electromagnetic steel sheet is used in which a first surface is formed into a rough surface, one disadvantage has been that magnetic properties and space factor decrease. Because hardness increases if the silicon content of the electromagnetic steel sheet is increased, making it hard to form the rough surfaces, another problem has been that grade constraints are placed on the electromagnetic steel sheet.

In the technique according to Patent Literature 3, because the gas drainage channels are formed on the weld portions, machining strain is generated around the gas drainage channels, and one disadvantage has been that magnetic properties decrease.

SUMMARY OF THE INVENTION

The present invention aims to solve the above problems and an object of the present invention is to provide a stator core, a manufacturing method therefor, and a rotary electric machine that uses that stator core that can suppress occurrence of weld defects, and that can improve magnetic properties without making a rough surface on an electromagnetic steel sheet or forming gas drainage channels on a weld portion, and also without grade constraints on the electromagnetic steel sheet, by decomposing an organic substance in an insulating coating at the weld portion thermally by performing preheating on outer circumferential portions of a laminated body of magnetic segments before welding the weld portion in question.

In order to achieve the above object, according to one aspect of the present invention, there is provided a method for manufacturing a stator core in which teeth are respectively arranged so as to extend radially inward from an inner circumferential surface of an annular core back at a predetermined pitch circumferentially, the method for manufacturing a stator core being characterized in including: a punching step in which magnetic segments that have a core back portion and tooth portions are punched out of an electromagnetic steel sheet that is coated with an organic insulating coating; a laminating step in which a laminated body is formed by laminating a predetermined number of the punched magnetic segments such that the core back portions and the tooth portions are respectively stacked on each other; a first preheating step in which a welding position on a wall surface on an opposite side of the stacked core back portions of the laminated body from the tooth portions is heated locally from a first end to a second end in a direction of lamination to decompose an organic component in the insulating coating thermally at the welding position; and a first welding step in which the welding position at which the organic component in the insulating coating is decomposed thermally is welded from the first end to the second end in the direction of lamination to interconnect and integrate the laminated magnetic segments.

According to the present invention, because the organic component in the insulating coating at the welding position of the laminated body is decomposed thermally by the first preheating step, generation of volatile gases in the first welding step due to thermal decomposition of the organic component in the insulating coating at the welding position of the laminated body can be suppressed. Thus, because it is not necessary to make a surface of the electromagnetic steel sheet into a rough surface, or to form a gas drainage channel on the weld portions, a stator core that has satisfactory magnetic characteristics can be manufactured. In addition, because it is not necessary to make the surface of the electromagnetic steel sheet into a rough surface, constraints on the grade of the electromagnetic steel sheet are eliminated, enabling the stator core to be manufactured inexpensively.

DETAILED DESCRIPTION OF THE PREFERRED EMBODIMENTS

Preferred embodiments of the present invention will now be explained using the drawings.

Embodiment 1

Figure 1:
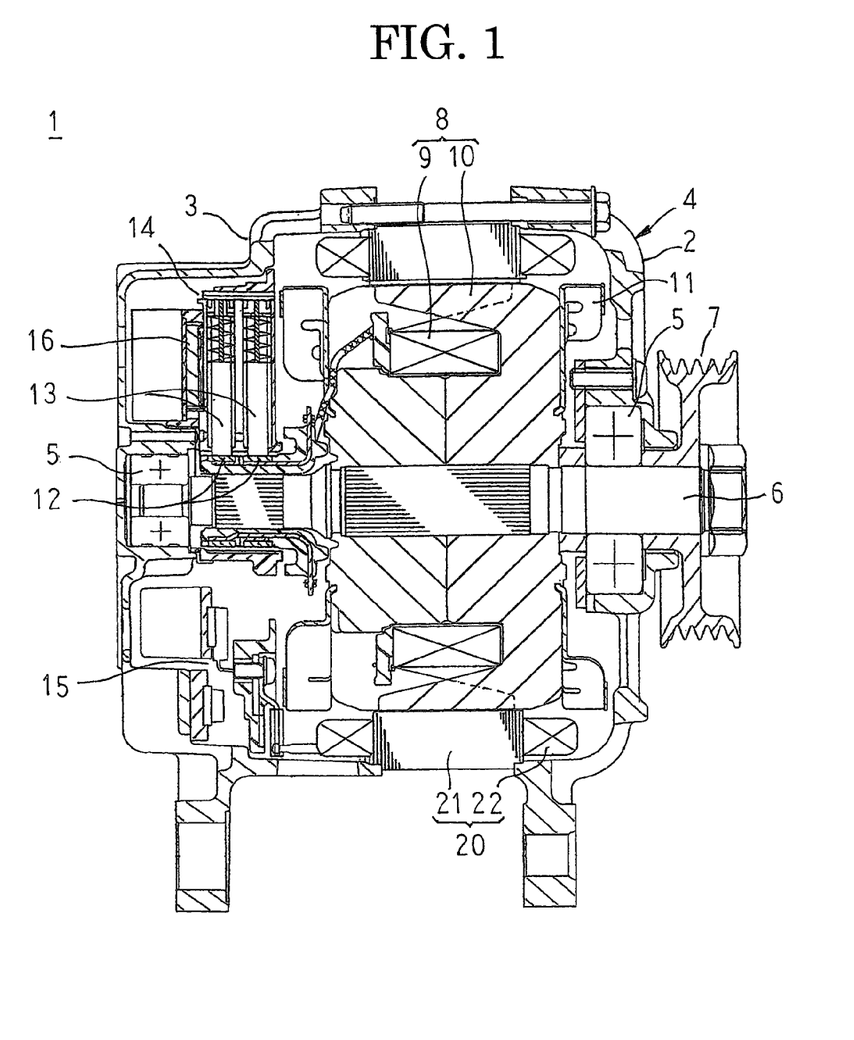
FIG. 1 is a longitudinal cross section that shows an automotive alternator according to Embodiment 1 of the present invention.
Figure 2:
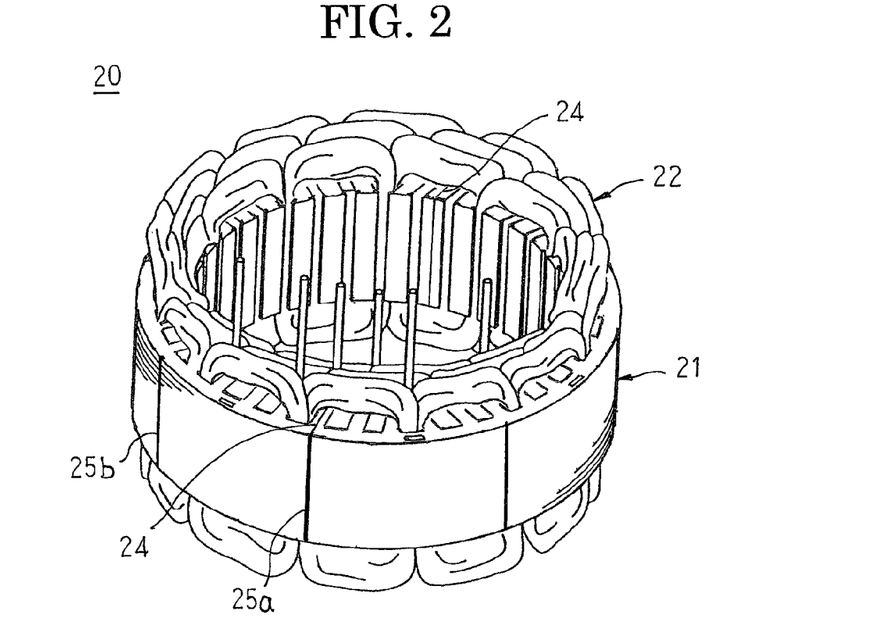
FIG. 2 is a perspective that shows a stator in the automotive alternator according to Embodiment 1 of the present invention.
Figure 3:
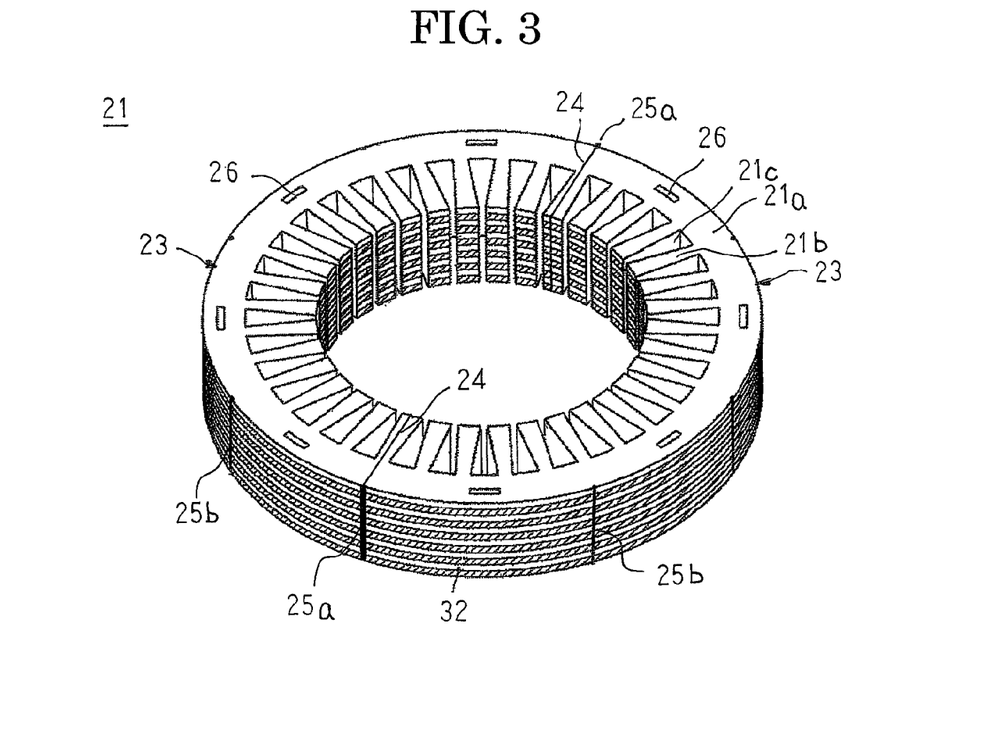
FIG. 3 is a perspective that shows a stator core in the automotive alternator according to Embodiment 1 of the present invention.
Figure 4:
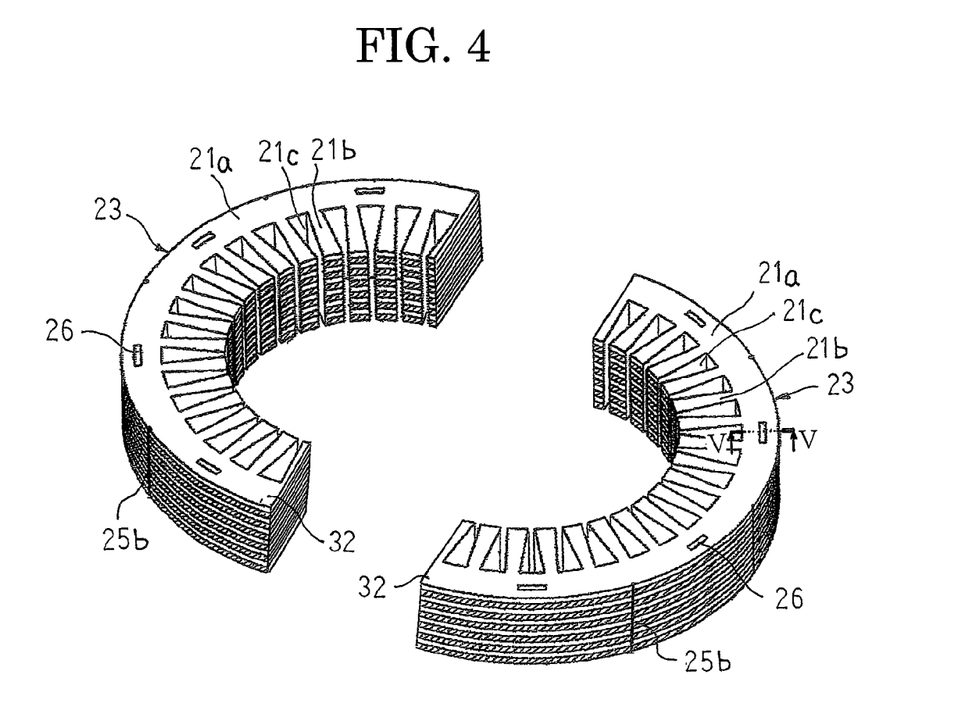
FIG. 4 is a perspective that shows laminated cores that constitute the stator core in the automotive alternator according to Embodiment 1 of the present invention.
Figure 5:
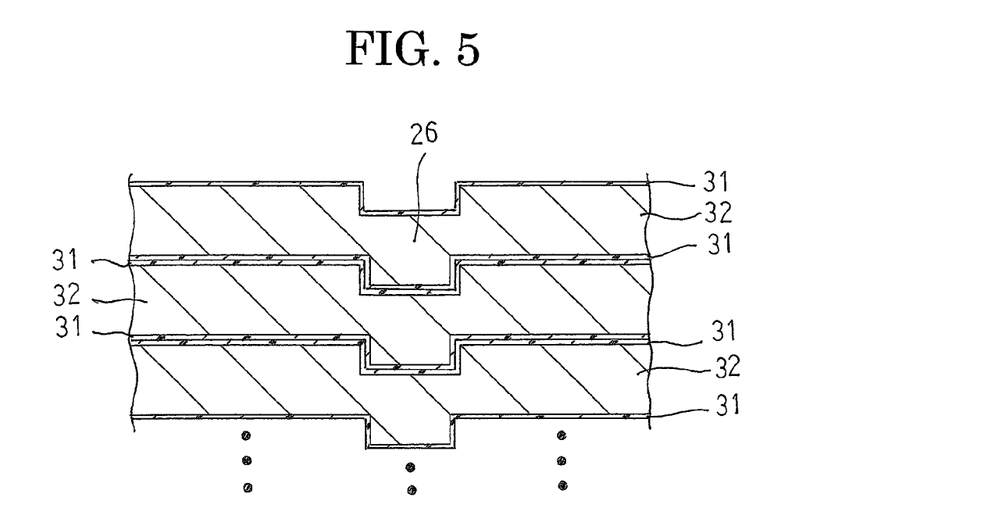
FIG. 5 is a V-V cross section from FIG. 4.

FIG. 1 is a longitudinal cross section that shows an automotive alternator according to Embodiment 1 of the present invention, FIG. 2 is a perspective that shows a stator in the automotive alternator according to Embodiment 1 of the present invention, FIG. 3 is a perspective that shows a stator core in the automotive alternator according to Embodiment 1 of the present invention, FIG. 4 is a perspective that shows laminated cores that constitute the stator core in the automotive alternator according to Embodiment 1 of the present invention, and FIG. 5 is a V-V cross section from FIG. 4.

In FIGS. 1 and 2, an automotive alternator 1 that functions as a rotary electric machine includes: a housing 4 that is constituted by a front bracket 2 and a rear bracket 3 that are each approximately bowl-shaped and made of aluminum; a shaft 6 that is rotatably supported in the housing 4 by means of bearings 5; a pulley 7 that is fixed to an end portion of the shaft 6 that extends out frontward from the housing 4; a rotor 8 that is fixed to the shaft 6 and that is disposed inside the housing 4; a stator 20 that is fixed to the housing 4 so as to surround the rotor 8; a pair of slip rings 12 that are fixed to a rear end of the shaft 6, and that supply electric current to the rotor 8; a pair of brushes 13 that slide on respective surfaces of the slip rings 12; a brush holder 14 that accommodates the brushes 13; rectifiers 15 that are electrically connected to the stator 20 so as to convert alternating current that is generated by the stator 20 into direct current; and a voltage regulator 16 that is mounted onto the brush holder 14, and that adjusts magnitude of an alternating-current voltage that is generated by the stator 20.

The rotor 8 includes: a field coil 9 that generates magnetic flux on passage of an excitation current; a pole core 10 that is disposed so as to cover the field coil 9, and in which magnetic poles are formed by the magnetic flux; and the shaft 6, which is fitted centrally through the pole core 10. Fans 11 are fixed to two axial end surfaces of the pole core 10 by welding, etc.

The stator 20 is held from two axial ends by the front bracket 2 and the rear bracket 3, and includes: a stator core 21; and a stator winding 22, which is mounted to the stator core 21. The stator 20 is disposed such that the stator core 21 is held between the front bracket 2 and the rear bracket 3 from two axial ends, and so as to surround the pole core 10 of the rotor 8 so as to ensure a uniform gap from the outer peripheral surface of the pole core 10.

In an automotive alternator 1 that is configured in this manner, a field current is supplied from a battery (not shown) through the brushes 13 and the slip rings 12 to the field coil 9 to generate magnetic flux. Claw-shaped magnetic pole portions of the pole core 10 are magnetized by this magnetic flux such that North-seeking (N) poles and South-seeking (S) poles alternate circumferentially.

At the same time, rotational torque from an engine is transferred to the shaft 6 by means of a belt (not shown) and the pulley 7 to rotate the rotor 8. Thus, rotating magnetic fields are applied to the stator winding 22 in the stator 20, generating electromotive forces in the stator winding 22. The alternating-current electromotive forces that are generated in the stator winding 22 are rectified into direct current by the respective rectifiers 15, and magnitudes of output voltages therefrom are adjusted by the voltage regulator 16 and supplied to the battery, and to on-board electrical loads, etc.

Next, construction of the stator core 21 will be explained.

As shown in FIG. 3, the stator core 21 has: an annular core back 21a; teeth 21b that each extend radially inward from an inner circumferential surface of the core back 21a, and that are arranged at a uniform angular pitch circumferentially; and slots 21c that are defined by the core back 21a and adjacent teeth 21b. As shown in FIG. 4, this stator core 21 is constituted by two semi-annular laminated cores 23. End surfaces of the two laminated cores 23 are abutted to each other, and the abutted portions 24 thereof are joined by welding to form the annular stator core 21. First weld portions 25a that interconnect the two laminated cores 23 are formed on outer circumferential surfaces of the abutted portions 24 from a first end to a second end in a direction of lamination.

As shown in FIG. 5, the laminated cores 23 are formed by stacking a predetermined number of the semi-annular magnetic segments 32 so as to be interconnected by crimped portions 26, and integrating the stacked magnetic segments 32 by welding. Moreover, in FIG. 4, three second weld portions 25b that integrate the stacked magnetic segments are formed on outer circumferential surfaces of the laminated cores 23 at a predetermined pitch circumferentially. The respective second weld portions 25b are formed on the outer circumferential surfaces of the laminated cores 23 so as to extend from the first end to the second end in the direction of lamination. In FIG. 5, an insulating coating 31 is coated onto two surfaces of the magnetic segments 32.

Figure 6:
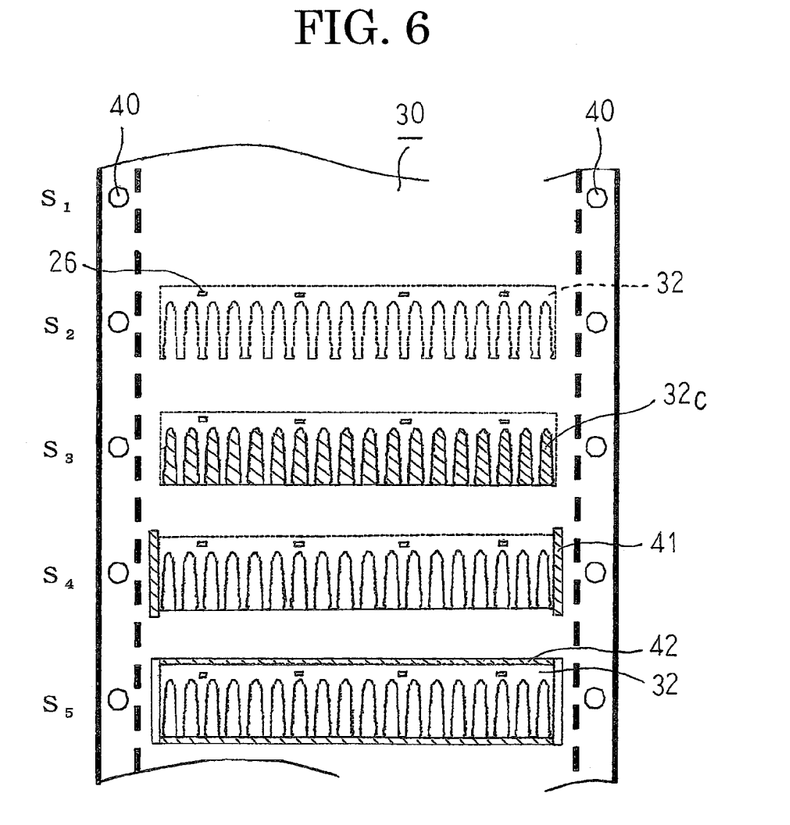
FIG. 6 is a diagram that explains a step of punching magnetic segments in a method for manufacturing the stator core according to Embodiment 1 of the present invention.
Figure 7:
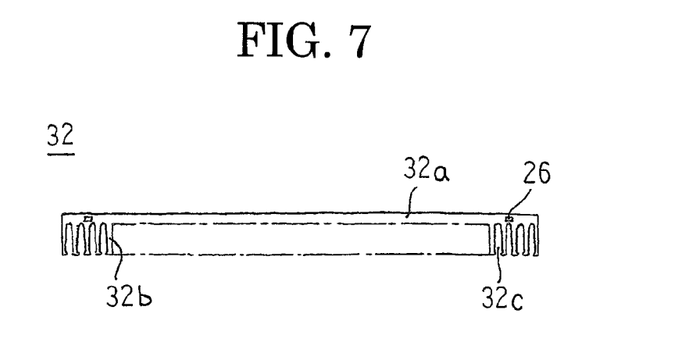
FIG. 7 is a plan that shows a magnetic segment in the method for manufacturing the stator core according to Embodiment 1 of the present invention.
Figure 8:
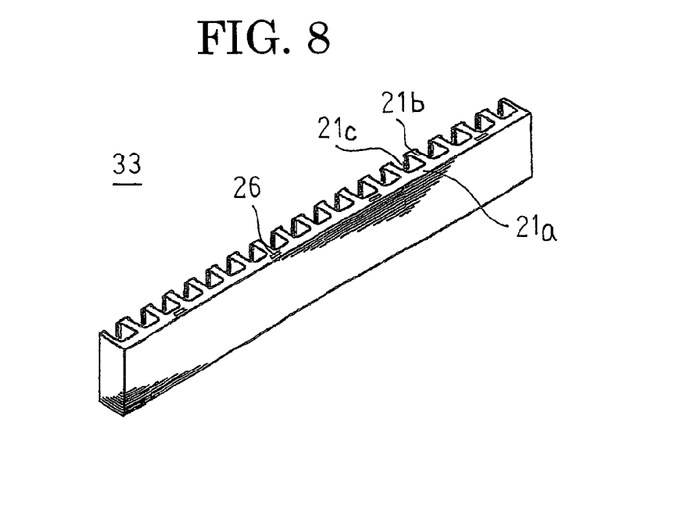
FIG. 8 is a perspective that shows a state of a laminated body before welding in the method for manufacturing the stator core according to Embodiment 1 of the present invention.
Figure 9A:
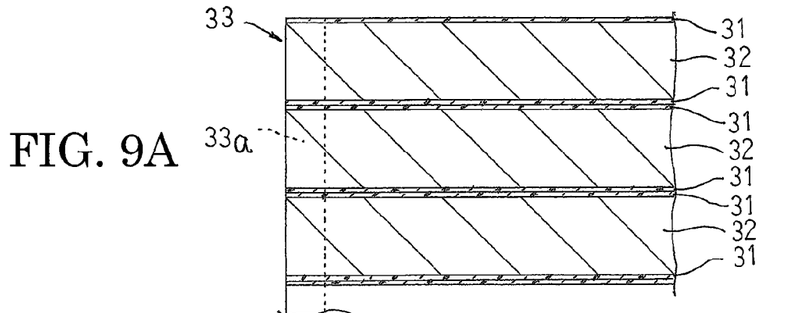
FIGS. 9A and 9B are diagrams that explain a first preheating step of the laminated body in the method for manufacturing the stator core according to Embodiment 1 of the present invention.
Figure 9B:
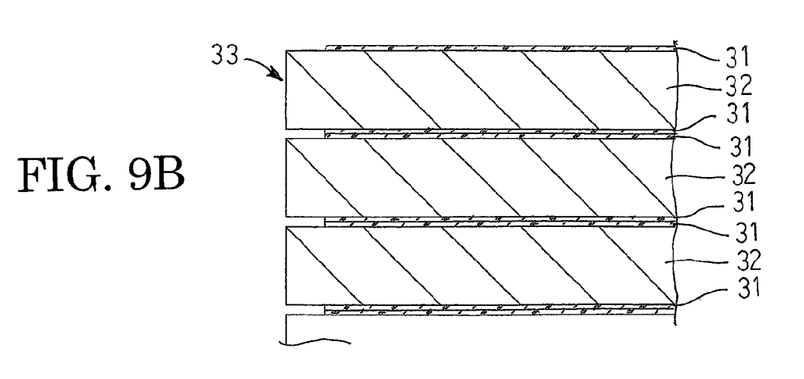
Figure 10:
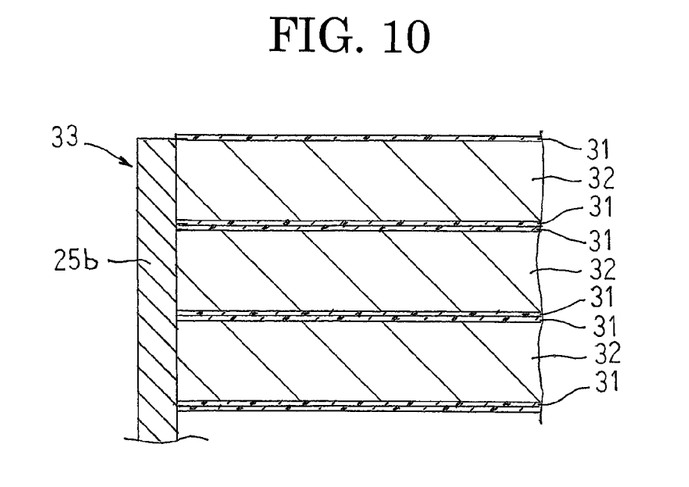
FIG. 10 is a partial cross section that shows the laminated body after welding in the method for manufacturing the stator core according to Embodiment 1 of the present invention.
Figure 11:
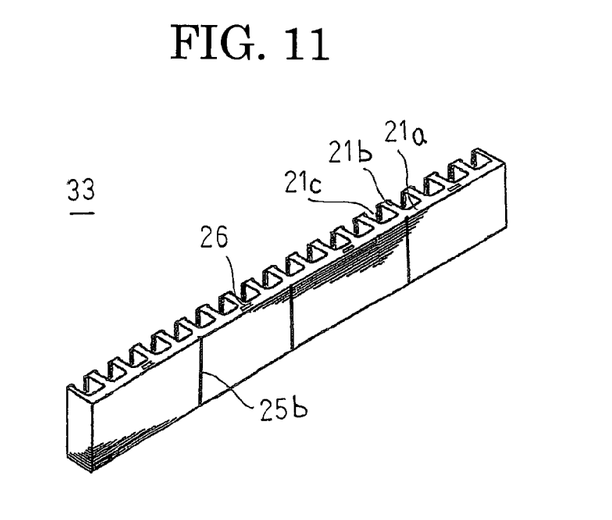
FIG. 11 is a perspective that shows the laminated body after welding in the method for manufacturing the stator core according to Embodiment 1 of the present invention.

Next, a method for manufacturing the stator core 21 will be explained. Moreover, FIG. 6 is a diagram that explains a step of punching magnetic segments in a method for manufacturing the stator core according to Embodiment 1 of the present invention, FIG. 7 is a plan that shows a magnetic segment in the method for manufacturing the stator core according to Embodiment 1 of the present invention, and FIG. 8 is a perspective that shows a state of a laminated body before welding in the method for manufacturing the stator core according to Embodiment 1 of the present invention. FIGS. 9A and 9B are diagrams that explain a first preheating step of the laminated body in the method for manufacturing the stator core according to Embodiment 1 of the present invention, FIG. 9A showing a state during preheating, and FIG. 9B showing a state after preheating. FIG. 10 is a partial cross section that shows the laminated body after welding in the method for manufacturing the stator core according to Embodiment 1 of the present invention, and FIG. 11 is a perspective that shows the laminated body after welding in the method for manufacturing the stator core according to Embodiment 1 of the present invention.

First, an electromagnetic steel sheet 30 is formed into a strip shape that has a predetermined width and that has a sheet thickness of 0.1 mm to 0.5 mm, for example, and two surfaces thereof are finished into smooth surfaces that have a surface roughness Ra of less than 0.5 μm. An organic insulating coating 31 that is constituted by a material such as an epoxy resin, a denatured product of an epoxy resin, a phenolic resin, a denatured product of a phenolic resin, an acrylic resin, a copolymer of an acrylic resin, or a silicone resin, is applied to and formed on the two surfaces of the electromagnetic steel sheet 30.

The electromagnetic steel sheet 30 is paid out from a winding drum (not shown), and is supplied to a pressing machine (not shown). In the pressing machine, as shown in FIG. 6, pilot apertures 40 are punched out on two width direction sides of the electromagnetic steel sheet 30 at a predetermined pitch in a longitudinal direction (S1), and then crimped portions 26 are formed relative to the pilot apertures 40 (S2). Next, slot portions 32c are punched out (S3), regions 41 at two longitudinal end portions of the magnetic segments 32 are punched out (S4), and regions 42 on two longitudinal side portions of the magnetic segments 32 are also punched out (S5). The magnetic segments 32 are punched out of the electromagnetic steel sheet 30 by these punching steps (S1 through S5).

As shown in FIG. 7, the punched magnetic segments 32 are formed into rectangular shapes that have a length that is half a total circumferential length of the stator core 21, and the tooth portions 32b are disposed so as to project from first sides in a width direction of the core back portions 32a and are arranged in rows at a predetermined pitch in the longitudinal directions of the core back portions 32a. The slot portions 32c are defined by the core back portions 32a and the tooth portions 32b. The crimped portions 26 are formed on the core back portions 32a at a predetermined pitch in the longitudinal direction thereof so as to be concave on a first surface side of the core back portions 32a and protrude on a second surface side.

As shown in FIG. 8, the rectangular parallelepiped laminated body 33 is formed by laminating a predetermined number of the magnetic segments 32 by stacking the core back portions 32a, the tooth portions 32b, and the slot portions 32c, and fixing them to each other by the crimped portions 26 (a laminating step). At this point, the core back portions 32a, the tooth portions 32b, and the slot portions 32c line up in the direction of lamination to configure the core back 21a, the teeth 21b, and the slots 21c, respectively.

Next, welding positions on the outer circumferential surface of the core back 21a of the laminated body 33 are preheated by applying a semiconductor laser from the first end to the second end in the direction of lamination (a first preheating step). Here, the amount of heat input from the semiconductor laser is adjusted such that the heated portion 33a that is shown in FIG. 9A is at approximately 600 degrees Celsius. An organic component in the insulating coating 31 in the heated portion 33a decomposes thermally, and a portion of the insulating coating 31 is ablated by this first preheating step, as shown in FIG. 9B.

Next, the heated portions 33a on the outer circumferential surface of the core back 21a of the laminated body 33 are welded by applying a carbon dioxide ($CO_2$) laser from the first end to the second send in the direction of lamination (a first welding step). The stacked magnetic segments 32 are thereby interconnected and integrated by the second weld portions 25b as shown in FIG. 10. Thus, the three second weld portions 25b are formed on the outer circumferential surface of the core back 21a of the laminated body 33, as shown in FIG. 11.

Next, semi-annular bending is applied to rectangular parallelepiped laminated bodies 33 (a bending step) to form two semi-annular laminated cores 23 (laminated bodies), as shown in FIG. 4. End surfaces of the two laminated cores 23 are then abutted to each other to arrange the two laminated cores 23 into an annular shape. Next, outer circumferential surfaces of the abutted portions 24 of the laminated cores 23 are preheated by applying a semiconductor laser from the first end to the second end in the direction of lamination (a second preheating step). The organic component in the insulating coating 31 at the outer circumferential surfaces of the abutted portions 24 decomposes thermally due to this second preheating step.

Next, the outer circumferential surfaces of the abutted portions 24 are welded by applying the $CO_2$ laser from the first end to the second end in the direction of lamination (a second welding step). First weld portions 25a that extend from the first end to the second end in the direction of lamination are thereby formed on the outer circumferential surfaces of the abutted portions 24 of the stator core 21. Thus, the abutted laminated cores 23 are interconnected and integrated to form the stator core 21. Here, although not shown, the laminated cores 23 are abutted with the stator winding 22 mounted, and are interconnected and integrated by laser welding. Thus, as shown in FIG. 2, the stator winding 22 is mounted into the stator core 21 at the same time as the stator core 21 is formed. A predetermined connection process is then applied to the stator winding 22 to form the stator 20.

Here, the organic component in the insulating coating 31 is explained as being preheated and decomposed thermally using a semiconductor laser, but the method of preheating is not limited to a semiconductor laser provided that it is a method that can heat locally, and a $CO_2$ laser or an yttrium aluminium garnet (YAG) laser can also be used, for example. The stacked magnetic segments 32 are also explained as being welded using a $CO_2$ laser, but may also be welded using a semiconductor laser or a YAG laser.

In Embodiment 1, before the first welding step in which the stacked magnetic segments 32 are interconnected and integrated, portions that correspond to the second weld portions 25b thereof (welding positions) are preheated to decompose the organic component in the insulating coating 31 thermally in the portions that correspond to the second weld portions 25b. In addition, before the second welding step in which the laminated cores 23 that are arranged into an annular shape are interconnected and integrated, portions that correspond to the first weld portions 25a thereof (welding positions) are preheated to decompose the organic component in the insulating coating 31 thermally in portions that correspond to the first weld portions 25a. Thus, because the generation of volatile gases that results from thermal decomposition of the organic component in the insulating coating 31 is suppressed during welding, the occurrence of pits and blowholes is suppressed in the first and second weld portions 25a and 25b, achieving superior welding quality, and also achieving ample weld strength.

Consequently, even if an automotive alternator 1 that incorporates a stator 20 that uses a stator core 21 that is manufactured in this manner is mounted to a vehicle, situations in which the stator core 21 is damaged can be avoided, achieving superior durability.

According to this manufacturing method, because the generation of volatile gases due to thermal decomposition of the organic component in the insulating coating 31 during welding is suppressed, there is no need to form surfaces of the magnetic segments 32 into rough surfaces, in other words, a dull finish is not required. Electromagnetic steel sheets that enable the dull finish are grades of electromagnetic steel sheet in which silicon content is low, but in this manufacturing method, the electromagnetic steel sheet used is not subjected to grade constraints. It is also no longer necessary to use an electromagnetic steel sheet that is coated with an insulating coating that does not contain an organic component, or an electromagnetic steel sheet that is not coated with an insulating coating, enabling conventional electromagnetic steel sheets that are coated with an insulating coating that contains an organic component to be used. Consequently, inexpensive electromagnetic steel sheets can be used, enabling reductions in the price of the stator core 21 to be achieved.

The organic component in the insulating coating 31 is decomposed thermally by preheating the welding positions on the laminated body 33 using a semiconductor laser. Because the spot size and the amount of heat input from the semiconductor laser are easily controlled, the organic component in the insulating coating 31 at the welding positions on the laminated body 33 and the laminated cores 23 can be thermally decomposed effectively.

Because electromagnetic steel sheets 30 that are coated with an insulating coating 31 can be used, extension of service life of the pressing die in the step of punching the magnetic segments 32 can be achieved.

Because the stator core 21 is configured by stacking magnetic segments 32 in which two surfaces are formed into smooth surfaces, space factor is increased compared to cores that are configured by stacking magnetic segments that are dull finished, enabling increased output.

Hysteresis loss, which is an individual component of core loss, does not depend on sheet thickness, but depends on grain size and surface roughness of steel sheet surfaces. In other words, hysteresis loss does not increase even if sheet thickness is reduced, as long as the sheet thickness does not become as thin as grain size. Because the two surfaces of the magnetic segments 32 are formed into smooth surfaces, increases in hysteresis loss can be suppressed. In addition, because the two surfaces of the magnetic segments 32 are formed into smooth surfaces, reductions in magnetization characteristics (magnetic permeability) are smaller than for magnetic segments that are dull finished. Consequently, magnetic properties of the stator core 21 are improved compared to cores that are configured by stacking magnetic segments that are dull finished.

Because it is not necessary to form gas drainage channels on the magnetic segments 32, reductions in magnetic characteristics that result machining strain that results from forming the gas drainage channels are also eliminated.

Embodiment 2

Figure 12:
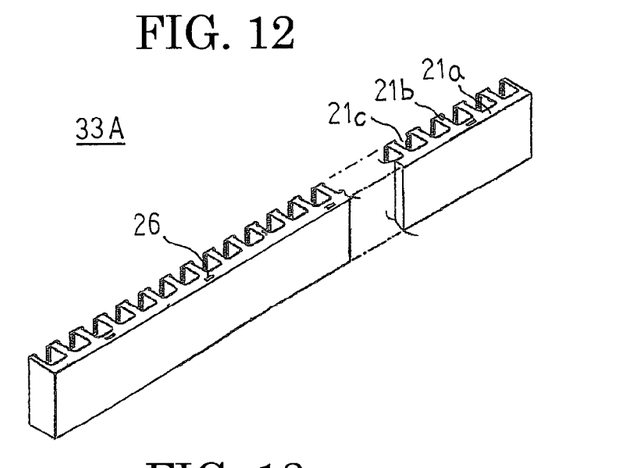
FIG. 12 is a perspective that shows a state of a laminated body before welding in a method for manufacturing a stator core according to Embodiment 2 of the present invention.
Figure 13:
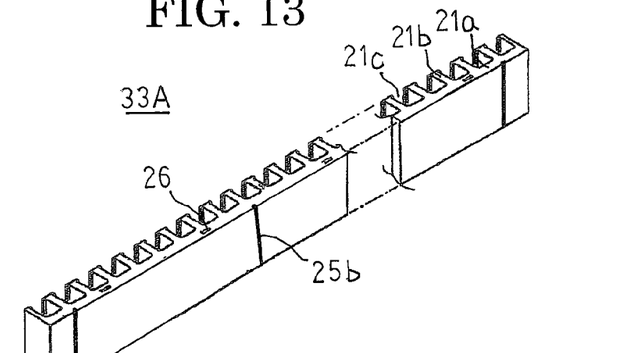
FIG. 13 is a perspective that shows the laminated body after welding in the method for manufacturing the stator core according to Embodiment 2 of the present invention.
Figure 14:
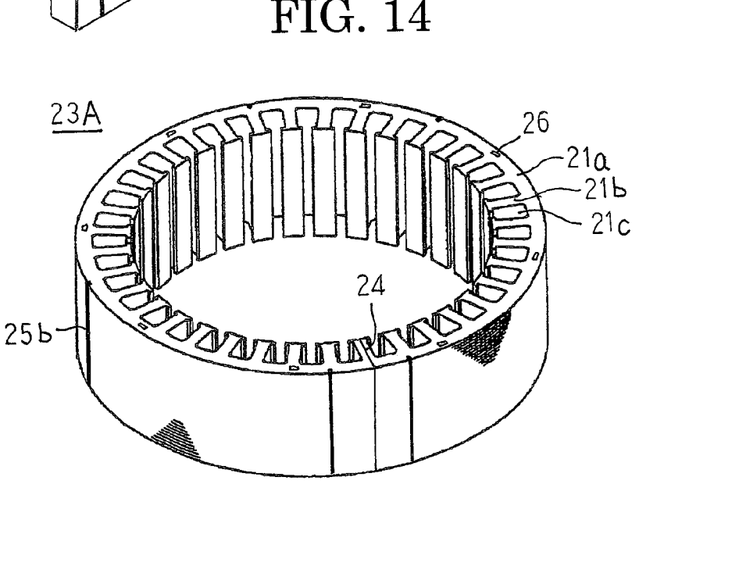
FIG. 14 is a perspective that shows an annular laminated core in the method for manufacturing the stator core according to Embodiment 2 of the present invention.
Figure 15:
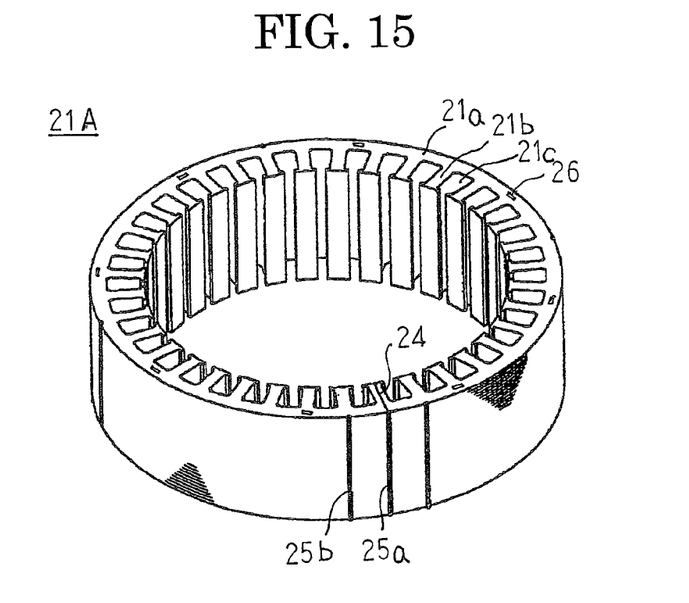
FIG. 15 is a perspective that shows a stator core that is manufactured in accordance with the method for manufacturing the stator core according to Embodiment 2 of the present invention.

FIG. 12 is a perspective that shows a state of a laminated body before welding in a method for manufacturing a stator core according to Embodiment 2 of the present invention, FIG. 13 is a perspective that shows the laminated body after welding in the method for manufacturing the stator core according to Embodiment 2 of the present invention, FIG. 14 is a perspective that shows an annular laminated core in the method for manufacturing the stator core according to Embodiment 2 of the present invention, and FIG. 15 is a perspective that shows a stator core that is manufactured in accordance with the method for manufacturing the stator core according to Embodiment 2 of the present invention.

In Embodiment 2, rectangular magnetic segments are punched out of an electromagnetic steel sheet 30 so as to have a length that is equal to an entire circumferential length of a stator core (a punching step). A predetermined number of the magnetic segments are then laminated while being fixed to each other by crimped portions 26 to form a rectangular parallelepiped laminated body 33A that is shown in FIG. 12 (a laminating step).

Next, welding positions on an outer circumferential surface of a core back 21a of the laminated body 33A are preheated by applying a semiconductor laser from a first end to a second end in a direction of lamination to decompose an organic component in an insulating coating 31 thermally at the heated portions (a first preheating step).

Next, the welding positions on the outer circumferential surface of the core back 21a of the laminated body 33A are welded by applying a $CO_2$ laser from the first end to the second end in the direction of lamination (a first welding step). Thus, a plurality of second weld portions 25b are formed on the outer circumferential surface of the core back 21a of the laminated body 33A, as shown in FIG. 13.

Next, annular bending is applied to the rectangular parallelepiped laminated body 33A (a bending step) to form an annular laminated core 23A (a laminated body), as shown in FIG. 14. End surfaces of the laminated core 23A are then abutted to each other, and outer circumferential surfaces of the abutted portions 24 are preheated by applying a semiconductor laser from the first end to the second end in the direction of lamination (a second preheating step). Next, the outer circumferential surfaces of the abutted portions 24 are welded by applying the CO2 laser from the first end to the second end in the direction of lamination to form the stator core 21A (a second welding step). A first weld portion 25a that extends from the first end to the second end in the direction of lamination is thus formed on the outer circumferential surfaces of the abutted portions 24 of the stator core 21A.

Consequently, in Embodiment 2, because the organic component in the insulating coating 31 is decomposed thermally by the first and second preheating steps before the first and second welding steps, similar or identical effects to those in Embodiment 1 above can also be achieved.

According to Embodiment 2, because the magnetic segments are formed so as to have a length that is equal to the entire circumferential length of the stator core 21A, only one rectangular parallelepiped laminated body 33A is required, thereby reducing the number of parts.

Embodiment 3

Figure 16:
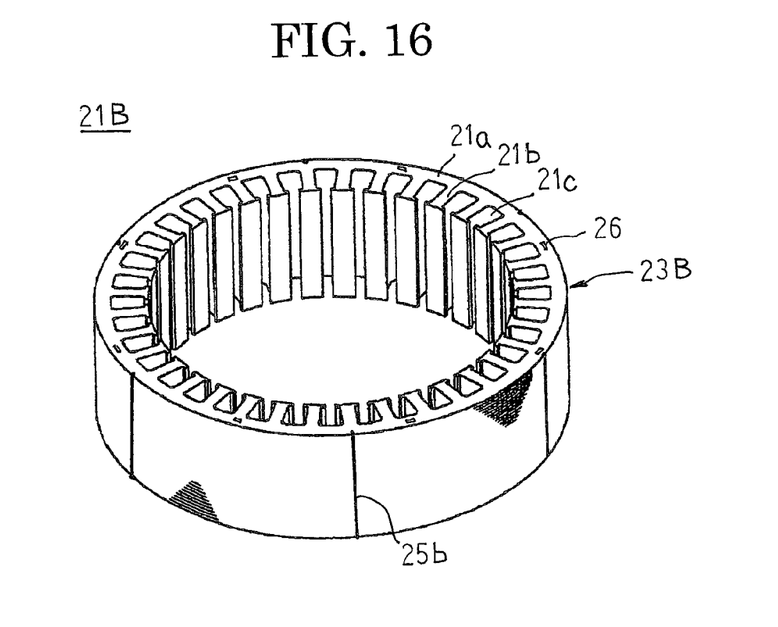
FIG. 16 is a perspective that shows a stator core that is manufactured in accordance with a method for manufacturing a stator core according to Embodiment 3 of the present invention.

FIG. 16 is a perspective that shows a stator core that is manufactured in accordance with a method for manufacturing a stator core according to Embodiment 3 of the present invention.

In Embodiment 3, although not shown, annular magnetic segments are punched out of an electromagnetic steel sheet 30 (a punching step), and a predetermined number of the punched magnetic segments are laminated while being fixed to each other by crimped portions 26 (a laminating step) to form an annular laminated core 23B (a laminated body). Next, welding positions on an outer circumferential surface of a core back 21a of the annular laminated core 23B are preheated by applying a semiconductor laser from a first end to a second end in a direction of lamination to decompose an organic component in an insulating coating 31 thermally at the heated portions (a first preheating step).

Next, the welding positions on the outer circumferential surface of the core back 21a of the annular laminated core 23B are welded by applying a $CO_2$ laser from the first end to the second end in the direction of lamination to form a stator core 21B (a first welding step). Thus, a plurality of second weld portions 25b are formed on the outer circumferential surface of the core back 21a of the stator core 21B, as shown in FIG. 16.

Consequently, in Embodiment 3, because the organic component in the insulating coating 31 is decomposed thermally by the first preheating step before the first welding step, similar or identical effects to those in Embodiment 1 above can also be achieved.

According to Embodiment 3, the materials yield in the step of punching the magnetic segments is poor, but the step of bending the laminated body is no longer required, enabling the process of manufacturing the stator core 21B to be simplified.

Moreover, in Embodiment 3 above, annular magnetic segments are punched out of an electromagnetic steel sheet, and a predetermined number of the annular magnetic segments are laminated to form an annular laminated core, but semi-annular magnetic segments may also be punched out of the electromagnetic steel sheet, and a predetermined number of the semi-annular magnetic segments laminated to form two semi-annular laminated cores.

Embodiment 4

Figure 17:
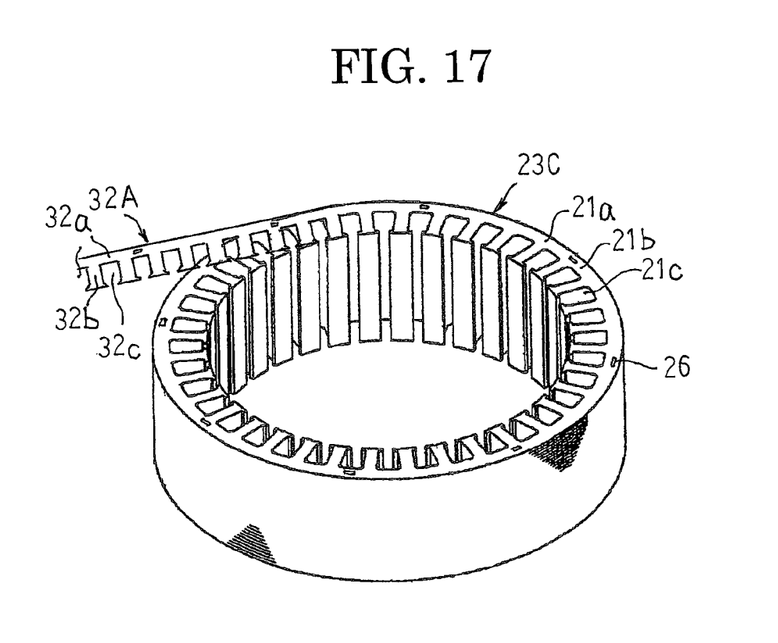
FIG. 17 is a perspective that explains a step of laminating an annular laminated core in a method for manufacturing a stator core according to Embodiment 4 of the present invention.
Figure 18:
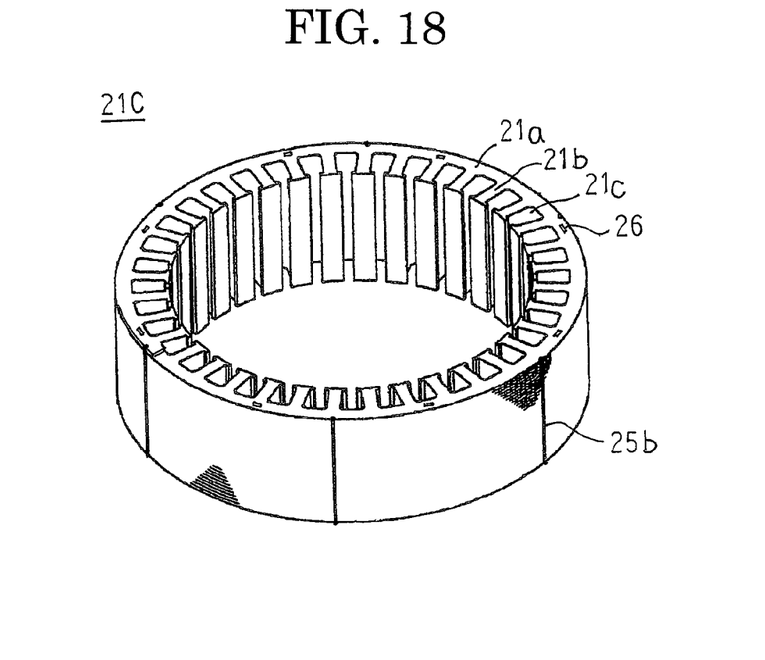
FIG. 18 is a perspective that shows a stator core that is manufactured in accordance with the method for manufacturing the stator core according to Embodiment 4 of the present invention.

FIG. 17 is a perspective that explains a step of laminating an annular laminated core in a method for manufacturing a stator core according to Embodiment 4 of the present invention, and FIG. 18 is a perspective that shows a stator core that is manufactured in accordance with the method for manufacturing the stator core according to Embodiment 4 of the present invention.

In Embodiment 4, as shown in FIG. 17, a strip-shaped magnetic segment 32A is punched out of an electromagnetic steel sheet 30 (a punching step), and the strip-shaped magnetic segment 32A is wound helically (a laminating step) to form an annular laminated core 23C. (a laminated body).

Next, welding positions on an outer circumferential surface of a core back 21a of the annular laminated core 23C are preheated by applying a semiconductor laser from a first end to a second end in a direction of lamination to decompose an organic component in an insulating coating 31 thermally at the heated portions (a first preheating step).

Next, the welding positions on the outer circumferential surface of the core back 21a of the annular laminated core 23C are welded by applying a $CO_2$ laser from the first end to the second end in the direction of lamination to form a stator core 21C (a first welding step). Thus, a plurality of second weld portions 25b are formed on the outer circumferential surface of the core back 21a of the stator core 21C, as shown in FIG. 18.

Consequently, in Embodiment 4, because the organic component in the insulating coating 31 is decomposed thermally by the first preheating step before the first welding step, similar or identical effects to those in Embodiment 1 above can also be achieved.

Moreover, in each of the above embodiments, an automotive alternator has been explained, but the present invention is not limited to automotive alternators, and similar effects are also exhibited when applied to other rotary electric machines such as automotive electric motors, or automotive generator-motors.

In each of the above embodiments, the second weld portions 25b that interconnect and integrate stacked magnetic segments are formed so as to extend axially on an outer circumferential surface of a stator core, but the second weld portions 25b may also be formed so as to extend on the outer circumferential surface of the stator core so as to have a predetermined angle relative to line segments on the outer circumferential surface of the stator core that are parallel to a central axis.

What is claimed is:

1. A method for manufacturing a stator core in which teeth respectively extend radially inward from an inner circumferential surface of an annular core back and are arranged at a predetermined pitch circumferentially,
said method for manufacturing a stator core comprising:
a punching step in which magnetic segments that have a core back portion and tooth portions are punched out of an electromagnetic steel sheet that is coated with an organic insulating coating;
a laminating step in which a laminated body is formed by laminating a predetermined number of said punched magnetic segments such that said core back portions and said tooth portions are respectively stacked on each other;
a first preheating step in which a welding position on a wall surface on an opposite side of said stacked core back portions of said laminated body from said tooth portions is heated locally, using a first type of laser, from a first end of the laminated body to a second end of the laminated body in a direction of lamination, to thermally decompose an organic component in said organic insulating coating at said welding position; and a first welding step in which said welding position at which said organic component in said organic insulating coating is decomposed thermally is welded, using a second type of laser different from the first type of laser, from said first end of said laminated body to said second end of said laminated body in said direction of lamination, to interconnect and integrate said laminated magnetic segments.

2. A method for manufacturing a stator core according to claim 1, wherein said welding position of said laminated body is heated locally using a semiconductor laser in said first preheating step.

3. A method for manufacturing a stator core according to claim 1, wherein:
said magnetic segments are punched out of said electromagnetic steel sheet in a rectangular shape in said punching step;
said laminated body that is formed by laminating said predetermined number of magnetic segments in said laminating step is a rectangular parallelepiped; and
said method for manufacturing a stator core further comprises:
a bending step in which a plurality of said rectangular parallelepiped laminated bodies in which said welding position is welded by said first welding step are each bent into a circular arc shape;
a step in which end surfaces of said rectangular parallelepiped laminated bodies that are bent into the circular arc shape are abutted to each other and arranged into an annular shape;
a second preheating step in which regions that extend from said first end to said second end in said direction of lamination on outer circumferential surfaces of said abutted portions of said laminated bodies that are arranged into the annular shape are heated locally to thermally decompose an organic component in said insulating coating in said regions; and
a second welding step in which said regions in which said organic component in said insulating coating is decomposed thermally are welded from said first end to said second end in said direction of lamination to interconnect and integrate said abutted portions.

4. A method for manufacturing a stator core according to claim 3, wherein said regions of said laminated body are heated locally using a semiconductor laser in said second preheating step.

5. A method for manufacturing a stator core according to claim 1, wherein:
said magnetic segments are punched out of said electromagnetic steel sheet in a rectangular shape in said punching step;
said laminated body that is formed by laminating said predetermined number of magnetic segments in said laminating step is a rectangular parallelepiped; and
said method for manufacturing a stator core further comprises:
a bending step in which said rectangular parallelepiped laminated body in which said welding position is welded by said first welding step is bent into an annular shape;
a second preheating step in which end surfaces of said rectangular parallelepiped laminated body that is bent into the annular shape are abutted to each other, and regions that extend from said first end to said second end in said direction of lamination on outer circumferential surfaces of said abutted portions are heated locally to thermally decompose an organic component in said insulating coating in said regions; and
a second welding step in which said regions in which said organic component in said insulating coating is decomposed thermally are welded from said first end to said second end in said direction of lamination to interconnect and integrate said abutted portions.

6. A method for manufacturing a stator core according to claim 5, wherein said regions of said laminated body are heated locally using a semiconductor laser in said second preheating step.

7. A method for manufacturing a stator core according to claim 1, wherein;
said magnetic segments are punched out of said electromagnetic steel sheet in a circular arc shape in said punching step;
said laminated body that is formed by laminating said predetermined number of magnetic segments in said laminating step is a circular arc shape; and
said method for manufacturing a stator core further comprises:
a step in which end surfaces of a plurality of said circular arc-shaped laminated bodies in which said welding position is welded by said first welding step are abutted to each other and arranged into an annular shape;
a second preheating step in which regions that extend from said first end to said second end in said direction of lamination on outer circumferential surfaces of said abutted portions of end portions of said circular arc-shaped laminated bodies are heated locally to thermally decompose an organic component in said insulating coating in said regions; and
a second welding step in which said regions in which said organic component in said insulating coating is decomposed thermally are welded from said first end to said second end in said direction of lamination to interconnect and integrate said abutted portions.

8. A method for manufacturing a stator core according to claim 7, wherein said regions of said laminated body are heated locally using a semiconductor laser in said second preheating step.

9. A method for manufacturing a stator core according to claim 1, wherein:
said magnetic segments are punched out of said electromagnetic steel sheet in an annular shape in said punching step; and
an annular laminated body is formed by laminating a predetermined number of said magnetic segments in said laminating step.

10. A method for manufacturing a stator core according to claim 1, wherein:
a magnetic segment is punched out of said electromagnetic steel sheet in a strip shape in said punching step; and
an annular laminated body is formed by winding said strip-shaped magnetic segment helically in said laminating step.

11. A method for manufacturing a stator core according to claim 1, wherein:
said first preheating step comprises preheating said welding position to approximately 600 degrees Celsius.

* * * * *